July 24, 1934.  F. E. WOLCOTT  1,967,986
COFFEE MAKER
Filed March 23, 1934

INVENTOR
FRANK E. WOLCOTT
BY
ATTORNEY

Patented July 24, 1934

1,967,986

UNITED STATES PATENT OFFICE 1,967,986

COFFEE MAKER

Frank E. Wolcott, West Hartford, Conn., assignor to The Silex Company, a corporation of Connecticut Application March 23, 1934, Serial No. 717,054

25 Claims. (Cl. 53—3)

My invention relates to coffee makers.

It has for its object the provision of an improved coffee maker, and more particularly an improved coffee maker of the type having upper and lower bowls and wherein an airtight seal must be provided between the stem of the upper bowl and the neck of the lower bowl. A further object of my invention is to provide an improved coffee maker of the above type having improved means for handling the upper bowl, particularly after completion of the coffee making operation when both bowls are hot and it is desired to break the seal and remove the upper bowl from the lower bowl, whereby removal of the hot upper bowl is facilitated while safeguarding the user against injury from contact with either of the hot bowls. A still further object is to provide a seal for a coffee maker of this type having an improved laterally extended grasping flange, or handle, which not only greatly facilitates the manipulation of the seal on the bowl stem but also provides a convenient, cool handle for the upper bowl situated remote from the bowl portion thereof and having novel handle means for shielding the hand of the user from the flared upper end of the lower bowl neck, thus greatly minimizing the danger of burning the hand upon separation of the bowls during use. A yet further object is to provide an improved seal of the type adapted to be more or less permanently located on the upper bowl stem and having an improved external, non-yielding grasping portion through which the stem projects and an improved internal resilient sealing portion interposed between the stem and grasping portion. These and other objects and advantages of my improved construction will, however, hereinafter more fully appear.

In the accompanying drawing, I have shown for purposes of illustration one form which my invention may assume in practice.

In the drawing,—

Figure 1:
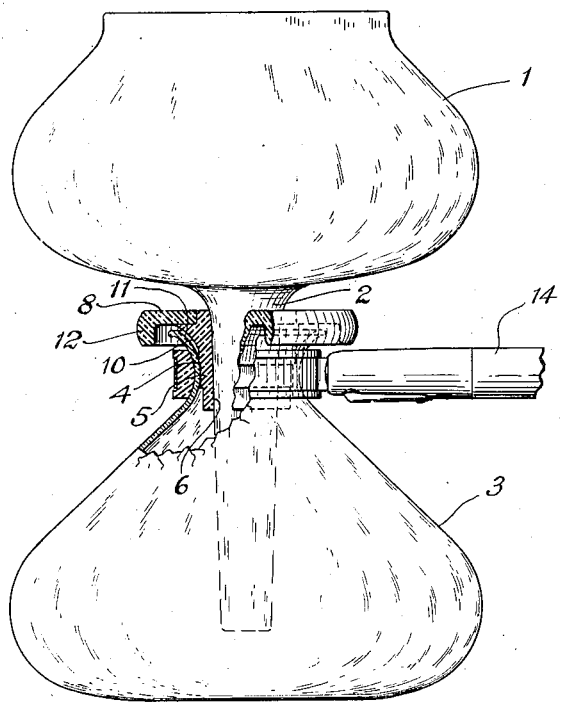
Figure 1 is a side elevation of a coffee maker equipped with my improved seal, portions of the lower bowl and the seal being broken away to facilitate illustration.
Figure 2:
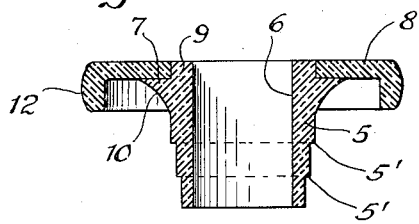
Figure 2 is an enlarged sectional view of the seal shown in Figure 1.
Figure 4:
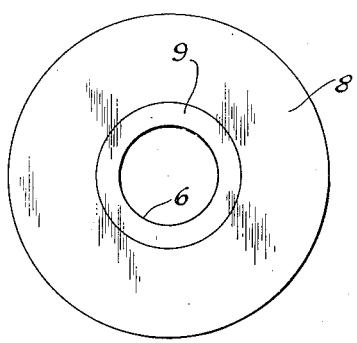
Figures 3 and 4 are bottom and top plan views, respectively, of the seal of Figure 2.
Figure 3:
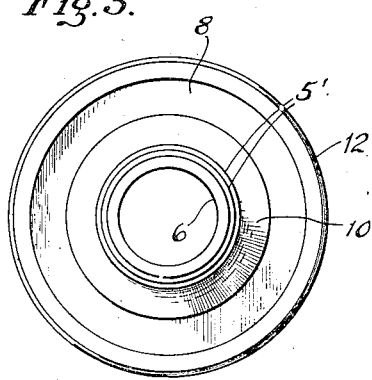

As herein shown, I have illustrated my invention as applied to a coffee maker comprising a usual upper bowl 1 having a lowered tapered stem 2 and a lower bowl 3 having an upstanding bell-mouthed neck 4 into which bowl the stem 2 is adapted to depend, my improved seal, constituting an improvement over that described and claimed in my copending application Serial No. 580,305, being located around the stem 2 and extended therewith into the neck 4 of the lower bowl, and having improved means, hereinafter described, for permitting the seal to be safely and conveniently grasped to rotate the same and the stem freely relative to the lower bowl neck to break its sealing engagement with said neck and permit the removal of the upper bowl, during which operations the seal serves as a cool, rigid handle for the upper bowl which also protects the hand of the user from contact with either bowl.

Referring more particularly to my improved seal, it will be noted that the same comprises a generally cylindrical body 5, preferably formed of soft live rubber or an equivalent material, having an axial passage 6 therethrough of uniform or tapered cross section as desired, and as herein shown having a stepped lower sealing end adapted to be located within the flared neck 4 and to provide spaced narrow bands of sealing engagement therewith. Also it will be noted that the resilient body of the seal is provided at a point slightly below its upper end and above the stepped portion with a short annular outstanding flange portion 7 which provides a flat seat for an annular grasping flange, or handle member, 8 hereinafter described, which surrounds a thin upper tubular end portion 9 of the seal body 5 projecting a short distance above the flange 7, while the member extends laterally a substantial distance therebeyond. Thus, a body 5 is provided which, while eliminating the necessity for a stepped axial passage, also is of an improved construction as compared with the seal disclosed in my application mentioned as regards the flange 7 and portion 9, both of the same being substantially smaller in section and requiring substantially less contact with the grasping flange or handle 8.

Preferably, although not necessarily, the top surface of said flange member 8 is flush with the upper end 9 of the soft rubber body portion 5 of the seal, as shown, so that the seal presents a plane top surface. The soft rubber flange 7 is formed with a concavely curved lower surface 10 which merges with the upper stepped portion of the body portion 5 and with the bottom surface of flange 8. The curve of the lower surface 10 conforms generally to the adjacent curved lip 11 of the bell-mouthed neck of the lower bowl with which it may make sealing engagement under some conditions, as when a lower bowl neck, due to variations in the manufacture thereof, is so large that the lower stepped portion of the seal does not provide an effective seal therewith. Attention is also directed to the fact that in my improved construction, a step at the bottom of the surface 10 is unnecessary, it being found that adequate sealing is provided over a wide range of neck diameters by using only two steps 5', the junction between the curved surface 10 and the seal body constituting in effect the equivalent of a step at this point.

The rigid flange member, or handle 8, is formed of a suitable non-yielding material of low specific heat, such, for example, as hard rubber, or an equivalent, and is also suitably connected to the body 5. Herein, being of rubber the member 8 is permanently united with the resilient body portion 5 by vulcanizing. The soft rubber tubular wall 9 of the body portion 5 which is enclosed by the grasping flange 8 is of such thickness as to permit the material thereof to yield readily and conform to the taper of the stem 2 when the seal is located on the upper end of the stem. Attention is further directed to the fact that member 8 has a relatively thin body section as compared with my prior seal mentioned, in such manner as further substantially to reduce both the heat transfer and heat storage capacity thereof, both the contact area between the tubular wall 9 and the flange 7 on the body 5 being substantially reduced.

As shown in Figure 1, when the upper bowl and seal are in position on the lower bowl, the flared lip 11 of the lower bowl neck is disposed close to but preferably always spaced slightly below the bottom of flange 8. The precise position relative thereto depending upon the neck diameter of the particular bowl. My improved seal also has provision for providing an effective grasping portion of substantially the same area as in my prior construction, despite the improved thin body portion of the member 8 and while also shielding the hand of the user from contact with the flared lip 11 of the hot lower bowl in a wholly new manner. Here it will be noted that a thin peripheral depending flange 12, of substantially the same cross section as the new thin body of the member 8, is provided which is suitably attached to the grasping flange 8 and which extends therebelow a sufficient distance to enclose the lip 11. As shown, this flange 12 is spaced laterally from the seal body 5 a sufficient distance to form an annular recess between the flange 12 and this body 5 of sufficient size to receive the flared end of said lip while shielding the hand of a person grasping the flange 12. Preferably, as shown, the outer flanged periphery of the rigid grasping member 8, including the depending flange 12 thereof, is slightly rounded for greater comfort in grasping it.

A rigid handle 14 is provided for the lower bowl 3 which surrounds the neck thereof at its minimum diameter below the grasping flange of the seal in the usual manner. Thus, a rigid handle is provided for both the upper and the lower bowls, making the separation of the two easy even when they are hot following a coffee making operation.

In use my improved seal is initially placed on the stem 2 in the position illustrated in Figure 1, by grasping the rigid flange of the seal and working the seal onto the tapered stem, the seal being easily rotated on the stem to facilitate this operation by reason of the large diameter and the rigidity of the flange 8. The stem of the upper bowl with the seal thereon is then inserted in the lower bowl neck, the grasping flange of the seal being utilized to rotate the seal in the neck, if necessary, to obtain sealing engagement with the neck. Following the coffee making operation, the upper bowl is removed from the lower bowl, the cool, rigid grasping flange of the seal being utilized as a handle for the hot upper bowl, first in rotating the seal in the lower bowl neck to break its sealing engagement therewith and subsequently in removing the bowl, all as described in my above mentioned application.

Herein by reason of the reduced mass of the grasping flange 8, due to its new, thin section and also by reason of the reduced contact area of the flange with the seal body resulting in part from this new thin section and in part from the shortening of the flange 7 of the seal body, the grasping flange is maintained cool to a degree never possible heretofore, while retaining the same ample gripping area at its periphery and additionally providing the new effective shrouding of the flared lip of the lower bowl neck.

While I have in this application specifically described the preferred form which my invention may assume in practice it will be understood that this form is shown merely for purposes of illustration and that the invention may be modified and embodied in various other forms and used with necks other than the bellmouth type without departing from its spirit or the scope of the appended claims.

What I claim as new and desire to secure by Letters Patent is:—

1. In a coffee maker, the combination with upper and lower bowls having a stem on the former and a neck on the latter receiving said stem, of a seal on said stem in said neck, and shrouding means on said seal shrouding the upper extremity of said neck comprising a grasping portion freely movable with said stem relative to said neck.

2. In a coffee maker, the combination with upper and lower bowls having a stem on the former and a neck on the latter receiving said stem, of a seal on said stem in said neck, and a peripheral depending grasping portion on said seal enclosing the upper end of said neck and freely movable with the stem relative to said neck when said portion is grasped by the hand.

3. In a coffee maker, the combination with upper and lower bowls having a stem on the former and a neck on the latter receiving said stem, of a seal on said stem in said neck, and a peripheral depending grasping portion on said seal of relatively unyielding material shrouding the upper extremity of said neck and sufficiently firm to prevent binding against said neck when grasped to remove the seal.

4. In a coffee maker, the combination with a lower bowl having an upstanding neck and an upper bowl having a depending stem receivable in said neck, of a seal comprising a tubular body surrounding said stem having an external sealing portion receivable in said neck, and a laterally extended grasping portion on said seal rotatable bodily with the latter and said stem relative to said neck and overlying said lower bowl neck and terminating in a depending peripheral flange extending below and shrouding the upper extremity of said neck.

5. In a coffee maker, the combination with a lower bowl having an upstanding neck and an upper bowl having a depending stem receivable in said neck, of a seal comprising a tubular body surrounding said stem having an external sealing portion receivable in said neck, and a laterally extended grasping portion on said seal rotatable bodily with the latter and said stem relative to said neck and overlying and extended laterally beyond said neck and terminating in a depending peripheral flange enclosing an annular chamber receiving the upper extremity of said neck.

6. In a coffee maker, the combination with a lower bowl having an upstanding neck terminating in a lip and an upper bowl having a depending stem receivable in said neck, of a seal comprising a tubular body of yieldable material surrounding said stem having an external sealing portion receivable in the neck passage, and a laterally extended grasping member of relatively unyielding material fixed to said seal overlying said lower bowl neck and having a depending flange extended below and shrouding the lip of said lower bowl.

7. In a coffee maker, the combination with a lower bowl having an upstanding neck and an upper bowl having a depending stem receivable in said neck, of a seal surrounding said stem and having a lower external sealing portion disposable in the passage of said neck, a grasping member on the top of said seal, and means between said seal and the periphery of said member for reducing the heat transmitted from the former to the periphery of the latter.

8. In a coffee maker, the combination with a lower bowl having an upstanding neck and an upper bowl having a depending stem receivable in said neck, of a seal surrounding said stem and freely rotatable therewith relative to said neck having a lower external sealing portion disposable in the passage of said neck, a seal releasing member on the top of said seal, and means on said member providing an increased peripheral gripping and heat dissipating section of greater depth than said member located laterally beyond said seal.

9. In a coffee maker, the combination with upper and lower bowls having a stem on the former and a neck on the latter receiving said stem, of a seal on said stem in said neck freely movable with the former relative to the latter, and a grasping portion on said seal above said neck having a grasping flange extending longitudinally of said stem.

10. In a coffee maker, the combination with upper and lower bowls having a stem on the former and a neck on the latter receiving said stem, of a seal on said stem in said neck freely movable with the former relative to the latter, and a grasping portion on said seal above said neck having a grasping flange extending longitudinally of said stem, said grasping flange being permanently out of contact with said lower bowl.

11. In a coffee maker, the combination with a lower bowl having an upstanding neck and an upper bowl having a depending stem receivable in said neck, of a seal comprising a tubular body of yieldable material surrounding said stem and freely rotatable therewith relative to said neck having an external sealing portion receivable in the neck passage, and a laterally extended grasping member comprising a flange of thin section extended laterally from the outer periphery of said body and overlying the lower bowl neck and terminating in a rim portion of increased thickness presenting increased gripping and heat dissipating area at the rim thereof.

12. In a coffee maker, the combination with a lower bowl having a pouring neck and an upper bowl having a depending stem, of a seal freely rotatable with the latter relative to said neck comprising a lower tubular sealing portion surrounding said stem and receivable in said neck, and grasping means having a thin upper flange portion extending laterally from the outer periphery of said seal and spaced vertically from the bowl portion of said upper bowl and overlying said neck and terminating in a relatively thick grasping rim spaced laterally beyond the periphery of said neck.

13. In a coffee maker, the combination with a lower bowl having a pouring neck and an upper bowl having a depending stem, of a seal surrounding said stem and receivable in said neck freely rotatable with the former relative to the latter and comprising a lower tubular sealing portion disposed on said stem and a laterally extended upper seal releasing flange portion overlying said neck and terminating in a grasping rim and having an inverted annular neck receiving recess in the bottom thereof between said tubular member and rim providing in said flange portion a thin section of restricted heat transmitting capacity between said tubular portion and rim and a thick section of increased heat radiating surface adjacent said rim.

14. In a coffee maker, the combination with a lower bowl having an upstanding neck and an upper bowl having a depending stem receivable in said neck, of a seal comprising a tubular body of yieldable material surrounding said stem having an external sealing portion receivable in the neck passage and a grasping member of relatively unyielding material fixed to said body portion adjacent the upper end thereof comprising a laterally extended flange of thin section overlying the lower bowl neck and having a depending rim portion forming an inverted neck receiving recess for the upper extremity of said lower bowl neck.

15. A coffee maker seal comprising a tubular body of yielding material having an external sealing portion, and a grasping member rotatable as a unit with said seal body having a thin body fixed to the upper portion of said seal body and extending laterally from the outer periphery thereof and having a peripheral grasping portion of increased cross section and greater rigidity than said body.

16. A coffee maker seal comprising a tubular body of yielding material having an external sealing portion, and a grasping member rotatable as a unit with said seal body having a thin body fixed to the upper portion of said seal body and extending laterally from the outer periphery thereof and having a peripheral grasping portion of greater rigidity than said seal body extending longitudinally thereof and permanently out of contact therewith.

17. A coffee maker seal comprising a tubular body of yielding material having an external sealing portion, and a grasping member fixed to the upper portion of said body comprising a flange extending laterally beyond said body and terminating in a depending flange forming a recess enclosed by the latter flange, said flanges being sufficiently firm to resist distortion when grasped by the hand.

18. A coffee maker seal comprising a tubular body of yielding material having an external sealing portion, and a grasping member sufficiently firm to resist substantial distortion under grasping pressure of the hand and fixed to the upper portion of said body and having a flange extended laterally beyond said body and terminating in a depending peripheral flange spaced laterally from said tubular body and forming an inverted annular recess at the top of the sealing portion of said body.

19. In a coffee maker seal, a tubular member having a lower external sealing portion of yielding material and an upper laterally extended flange portion sufficiently firm to resist substantial distortion under grasping pressure of the hand terminating in a grasping rim and having a reduced cross sectional area between said tubular member and said grasping rim limiting the transfer of heat from said tubular portion to said rim.

20. In a coffee maker seal, a tubular member having a lower external sealing portion of yielding material and a thin upper laterally extended flange portion of relatively rigid material terminating in a relatively thick grasping rim.

21. In a coffee maker seal, a tubular member having a lower external sealing portion of yielding material and an upper laterally extended flange portion of relatively unyielding material terminating in a grasping rim and having an inverted annular recess in the bottom of said flange portion between said tubular portion and rim providing in said flange portion a thin section of restricted heat transmitting capacity adjacent said tubular portion and a thick section of increased heat radiating capacity adjacent said rim.

22. A coffee maker seal comprising a tubular body of yielding material having an external sealing portion, and a grasping member of relatively unyielding material fixed to the upper portion of said body comprising a relatively thin annular flange extended laterally beyond said tubular body having a thickened peripheral portion presenting increased grasping area at the rim thereof.

23. A coffee maker seal comprising a tubular body of yielding material having an external sealing portion, and a grasping member of relatively unyielding material fixed to the upper portion of said body comprising a relatively thin annular flange extended laterally beyond said body presenting a restricted heat conducting section and having a thickened rim portion of increased heat radiating area in the vicinity of the periphery of said member.

24. In a coffee maker sealing member, a tubular body of yielding material having a lower external sealing portion and an upper external sealing portion comprising an upwardly and outwardly directed sealing surface merging with the lower sealing portion of the body and forming a flange thereabove, and a grasping member of relatively unyielding material seated on said flange comprising a thin laterally extended flange having an integral depending peripheral flange which is laterally spaced from said upper sealing surface providing a thickened peripheral grasping and heat radiating portion for said member.

25. In a coffee maker sealing member, a tubular body of yielding material having an external sealing portion comprising a lower stepped portion and an upper upwardly flared portion, and a grasping member of relatively unyielding material fixed to said body above said upper sealing portion and extended laterally therebeyond, said member being relatively thin and having a depending flange at its periphery providing a heat dissipating grasping rim which terminates adjacent the lower end of said upper sealing portion and constitutes an enclosing wall for an annular inverted recess adjacent said upper sealing portion.

FRANK E. WOLCOTT.